Sept. 23, 1958     W. STELZER     2,852,920
BOOSTER BRAKE MECHANISM
Filed Oct. 1, 1956
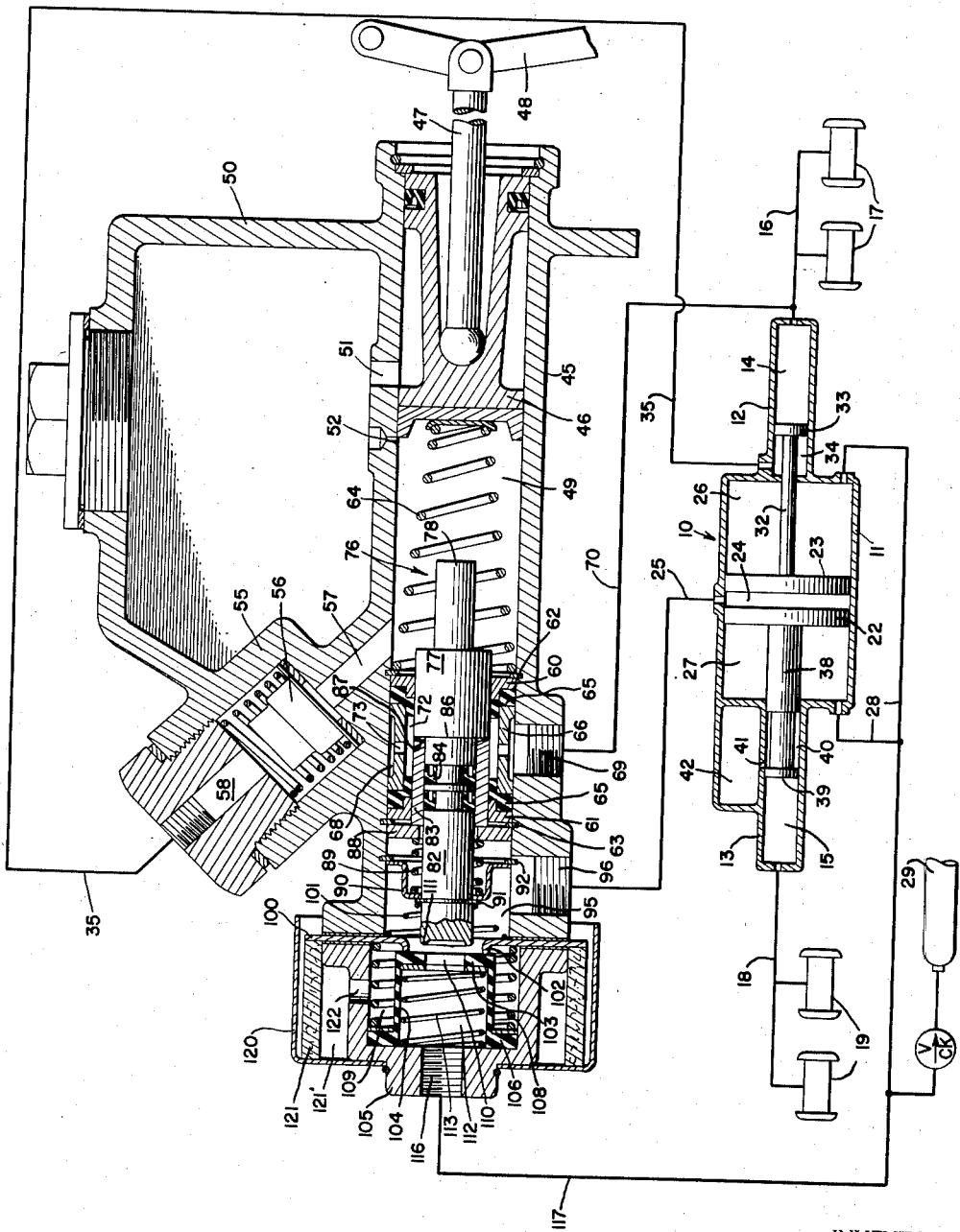
INVENTOR
WILLIAM STELZER
BY *John F. Philips*
ATTORNEY

United States Patent Office 2,852,920
Patented Sept. 23, 1958

2,852,920

BOOSTER BRAKE MECHANISM

William Stelzer, Bloomfield Hills, Mich., assignor to Kelsey-Hayes Company, a corporation of Delaware Application October 1, 1956, Serial No. 613,218

11 Claims. (Cl. 60—54.5)

This invention relates to a booster brake mechanism.

Earlier types of booster brake mechanisms, while highly practicable, have been open to a number of objections. For example, in some, initial movement of the brake pedal took place against appreciable resistance due to the necessity for having to impart movement to the fluid displacing plunger of the master cylinder. Thereafter, upon initial energization of the booster motor associated with such system, resistance to movement of the brake pedal would drop. This caused an objectionable "lumpiness" in the initial pedal operation. Such disadvantage was overcome with later constructions which provided for relatively free initial pedal movement through an appreciable portion of its travel before reaction forces were transmitted to the brake pedal. Such system was found disadvantageous since the operator had the feeling, in initial operation thereof, that the brake pedal was falling away from his foot.

It is highly advantageous in a system of this character to provide for a soft initial movement of the brake pedal followed by a progressively increasing resistance or reaction prior to the generation of substantial pressures in the hydraulic brake lines, followed by stronger reaction forces during actual brake application, with such forces progressively increasing as the braking pressures increase. It is most desirable that the reaction forces be hydraulic forces related and proportional to the generation of braking forces in the brake lines to provide the most accurate "feel" in the reaction against the brake pedal, and such a system is provided in the copending application of Jeannot G. Ingres, Serial No. 612,794, filed September 28, 1956.

The present apparatus is also an improvement over the system shown in my copending application Serial No. 330,942, filed January 13, 1953. In such system, a valve mechanism is operated by fluid displaced from a pedal operated master cylinder to operate the booster motor to displace fluid into the brake lines. Such valve operation occurs without substantial resistance until braking pressures in the brake lines reach a predetermined point, for example when the brake shoes initially engage the drums, after which a direct hydraulic reaction force is transmitted to the valve operating means which is responsive to fluid displaced from the pedal operable master cylinder. The present construction is an improvement over the structure in my copending application in that it provides for hydraulic reaction in the interim between initial brake pedal operation and the point at which the mechanism begins to apply reaction forces to the brake pedal incident to the building up of predetermined pressures in the hydraulic brake lines.

An important object of the present invention is to provide a mechanism which is simplified with respect to the mechanism shown in the copending application of Jeannot G. Ingres, referred to above.

A further object is to provide such a mechanism wherein the control and reaction mechanism for the system is carried by and forms in effect a unit with the pedal operable master cylinder.

A further object is to provide a simplified mechanism of the character referred to wherein a more direct operation of the booster motor valve mechanism is provided and wherein the reaction and valve mechanisms are coaxially arranged with and are associated with the pedal operable master cylinder.

A further object is to provide a mechanism of the character referred to wherein the valve operating and reaction plunger means is arranged coaxial with the pedal operable master cylinder plunger and is so arranged as to transmit, through the hydraulic fluid in the master cylinder, reaction forces to the pedal operable master cylinder plunger, and to subject the reaction plunger to additional reaction forces when hydraulic pressures in the brake lines increase to a predetermined point.

A further object is to provide such a mechanism which is operable directly by the master cylinder plunger to operate the valve mechanism upon a failure of pressure in the pedal operable master cylinder for any reason, for example upon a failure of the cup of the master cylinder plunger, thus providing for the power application of the brakes.

Other objects and advantages of the invention will become apparent during the course of the following description.

In the drawing I have shown one embodiment of the invention. In this showing:

The figure is a vertical axial sectional view through the pedal operable master cylinder and the control mechanism associated therewith, the booster motor and other elements of the system being diagrammatically represented.

Referring to the drawing, the numeral 10 designates a booster motor of any desired type, shown in the present instance as being a double-ended vacuum suspended motor, as will become apparent. The motor comprises a cylinder 11 from opposite ends of which project axial casings 12 and 13 respectively forming hydraulic chambers 14 and 15. The chamber 14 is connected by hydraulic lines 16 to one set of wheel cylinders 17, which may be the front or rear wheel cylinders of a vehicle, depending on the type of vehicle. The chamber 15 is connected through hydraulic lines 18 to the other pair of wheel cylinders 19 of the vehicle.

Pistons 22 and 23 are reciprocable in the cylinder 11 and form therebetween a variable pressure chamber 24 in fixed communication with a fluid line 25 in which pressures are controlled in a manner to be described. The pistons 22 and 23 form with opposite ends of the motor respectively constant pressure chambers 26 and 27 connected by lines 28 with a source of vacuum such as the intake manifold 29 of the motor vehicle. It will be apparent that with the motor as illustrated constant vacuum exists at all times under normal conditions in the chambers 26 and 27.

The piston 23 is connected by a piston rod 32 to a plunger 33 movable into the chamber 14 to displace fluid therefrom. Back of the plunger 33 is formed a primary pressure chamber 34 to which hydraulic fluid is supplied through a line 35 as described below.

It will become apparent that the plunger 33 is operated both by power of the piston 23 and by forces generated in the pedal operable master cylinder described below. The piston 22 is solely depended upon for generating pressures in the chamber 15. To this end, the piston 22 is provided with a plunger rod 38 having at its end a plunger 39 operable in the chamber 15. Back of the plunger 39, the rod 38 is reduced in diameter as at 40 to provide a space communicating through a port 41 with a fluid reservoir 42. In practice, the plunger 39 is provided with a conventional lipped cup which is adapted to flex for the flow of fluid from port 31 into the chamber 15, if necessary, to replenish fluid losses from the chamber 15. The reservoir 42 is provided for the chamber 15 and forms the sole source of supply for hydraulic fluid to such chamber. A reservoir is unnecessary for the cylinder 14 since hydraulic fluid is supplied to this chamber from the line 35 and chamber 34, as will become apparent.

A master cylinder 45 is provided with a conventional plunger 46 operable by a rod 47 connected to a conventional pedal 48 to displace fluid from the master cylinder chamber 49. Above the master cylinder 45 is arranged a reservoir 50 communicating with the master cylinder back of the plunger 46 through the usual port 51, and communicating with the master cylinder ahead of the plunger 46 through the usual compensating port 52.

Instead of displacing fluid from the master cylinder chamber 49 axially thereof in the usual manner, an angularly arranged valve housing 55 is provided and has mounted therein a conventional residual pressure valve 56 to, and past which, hydraulic fluid flows from the chamber 49 through a duct 57. Fluid displaced from the master cylinder chamber 49 flows through a port 58 into the line 35 leading to the primary chamber 34 of the booster motor.

In the master cylinder is arranged a pair of axially spaced bearing rings 60 and 61 fixed in position by snap rings 62 and 63. The snap ring 62 forms a seat for one end of a return spring 64 the other end of which biases the plunger 46 to normal off position. Inwardly of the bearing rings 60 and 61 are arranged seals 65, and between these seals is arranged a sleeve 66 externally annularly grooved to provide an annular chamber 68 communicating through a port 69 with a line 70 tapped into the line 16. Within the sleeve 66 is formed an annular chamber 72 communicating with the chamber 68 through ports 73.

A valve actuating and reaction plunger indicated as a whole by the numeral 76 is provided with a relatively large head 77 slidable in the bearing ring 60. The end of the plunger 76 toward the pedal operated plunger 46 is provided with an axial extension 78, engageable with the plunger 46 under conditions to be described.

The plunger 76 at the end thereof opposite the extension 78 is reduced in size as at 82. Such portion of the plunger 76 is slidable in a sleeve 83 and is sealed with respect thereto as at 84. The two plunger portions 77 and 82 cooperate to form a shoulder 86 forming a hydraulic pressure area as described below, and the adjacent end of the sleeve 83 normally engages the shoulder 86. The shoulder 86 and the adjacent end of the sleeve 83 are not machined and accordingly the abutting surfaces thus provided are subject to pressure in the annular chamber 72. To insure the subjection of the abutting surfaces referred to to pressure in the chamber 72, the end of the sleeve 83 may be conically undercut as shown to provide a fluid space and the communication of such space with the annular chamber 72 may be assured, if desired, by notching the end of the sleeve 83 as as 87.

The other end of the sleeve 83 engages a ring 88 which normally seats against the snap ring 63. The ring 88 is biased to the normal position shown in the figure by a spring 89 the other end of which engages the inner flange of a spring cage 90, such cage engaging a snap ring 91 carried by the plunger 82. The other end of the cage 90 engages a snap ring 92 carried by the master cylinder body 45. The cage 90 is arranged in a chamber 95 communicating through a port 96 with the fluid line 25 previously described.

Against the end of the master cylinder body adjacent the plunger portion 82 is arranged a plate 100. A spring 101 has one end arranged against such plate and the other end engaging the snap ring 91 to bias the plunger 76 to the normal position shown.

The inner portion of the plate 100 is turned to the left in the drawing to form a valve seat 102. Such seat is normally engaged by a valve 103 carried by a resilient normally cylindrical body 104 which is collapsible as a bellows, as will become apparent. Such bellows is arranged within a cap member 105 axially recessed to receive the left end of the bellows, and the latter is provided with a sealing flange 106 maintained in normal sealing position against the adjacent wall of the cap 105 by a spring 108. This spring is arranged in an air chamber 109 which is normally disconnected from the chamber 95 by the seating of the valve 103. This valve has an axial port 110, and the adjacent end of the plunger portion 82 is provided with a valve seat 111 of larger size than the port 110 and engageable with the valve 103 to unseat it as described below.

The resilient body 104 or bellows forms therein a vacuum chamber 112 in which is arranged a coil spring 113. This spring serves to seat the valve 103 and to prevent the body or bellows 104 from collapsing due to the air pressure externally thereof. The chamber 112 communicates through a port 116 with a line 117 leading to the intake manifold.

A shell 120 is carried by the cap member 105 and houses therein an air cleaner 121 forming therein an annular air chamber 121' communicating with the chamber 109 through one or more ports 122.

*Operation*

The parts normally occupy the positions shown in the drawing. When the brakes are to be applied, the operator depresses the pedal 48 to displace fluid from the chamber 49 through duct 57, past the residual pressure valve 56 and through line 35 into the chamber 34. The plunger 33 preferably is of the type which is now well known and provides for the passage of fluid from the primary chamber 34 into the secondary chamber 14 to move the brake shoes associated with the cylinders 17 toward the brake drums. Prior to this action, pressure generated in the chamber 49 moves the plunger 76 toward the left, whereupon the valve seat 111 engages the valve 103 to disconnect the chambers 95 and 112. This operation disconnects the chamber 95 from the source of vacuum. Further movement of the valve seat 111 moves the valve 103 away from the seat 102, thus connecting the chamber 95 to the air chamber 109 for the flow of air through line 25 into the chamber 24 of the booster motor unit. Since vacuum is always maintained in the motor chambers 26 and 27, the admission of air into the chamber 24 moves the pistons 22 and 23 away from each other to displace fluid from the chambers 14 and 15 into the associated brake lines.

Movement of the mechanism in the manner just described takes place with the shoulder 86 in engagement with the adjacent end of the sleeve 83. The spring 89 maintains the ring 88 in engagement with the sleeve 83, and the ring 88, spring 89, cage 90 and snap ring 91 move as a unit to the left with the plunger 76.

Operation of the booster motor generates pressure in the chamber 15 to operate the brake cylinders 19, and application of the associated brakes takes place solely by power generated by the piston 22. Operation of the plunger 33 is effected by the power of the piston 23 and hydraulic pressure transmitted to the chamber 34 from the pedal operable master cylinder. Hydraulic pressure generated in the chamber 14 is transmitted through line 70 to the chamber 72. This pressure acts to the right against shoulder 86 and to the left against the adjacent end of the sleeve 83. The sleeve 83 transmits such pressure force through ring 88, spring 89, cage 90 and snap ring 91 to the plunger portion 82. Such force will exactly balance the pressure acting against the shoulder 86, since the areas of the shoulder 86 and the adjacent end of the sleeve 83 are equal. Therefore, there will be no hydraulic reaction forces transmitted to the right against the shoulder 86 until after the spring 89 has yielded, as described below.

As pressure continues to build up in the chamber 14, it will exert against the right-hand end of the sleeve 83 a pressure greater than the loading of the spring 89. The hydraulic pressure acting on the sleeve 83 will then move the ring 88 into engagement with the snap ring 92, whereupon the progressively increasing hydraulic pressure in the chamber 72 will act against the shoulder 86 to oppose movement of the plunger 76 to the left, thus transmitting hydraulic reaction forces to the pedal operated plunger 46 through hydraulic fluid in the master cylinder chamber 49. This hydraulic reaction, of course, will continue to increase as pressure increases in the secondary chamber 14 of the booster unit, and accordingly the operator will feel progressively increasing reaction against the foot pedal as application of the brakes increases.

The point at which the sleeve 83 moves away from the shoulder 86 preferably is coincident with the increase in pressure in the chamber 14 incident to the engagement with the brake drums of the brake shoes associated with the wheel cylinders 17. The movement of the plunger 76 is then subject to a balance between the primary or pedal generated pressure in the chamber 49 acting on the area of the plunger portion 77 (assisted by the spring 89 acting against the snap ring 91) and the secondary pressure acting on the area of the shoulder 86, which is equal to the area of the plunger portion 77 minus the area of the plunger portion 82. This area is substantially smaller than the area of the plunger portion 77 acted on by hydraulic pressure in the chamber 49, but the pressure acting on the shoulder 86 is much higher than pressure in the chamber 49. The relative areas of the plunger 76 acted on by the primary and secondary pressures can be designed to provide any reaction ratio desired.

In the event of overtravel of the plunger 46 through lack of pressure in the chamber 49 caused, for example by a failure of the cup of the plunger 46, the latter plunger will engage the axial extension 78 to move the plunger 76 by direct manual force. This operation engages the valve seat 111 with the valve 103 to operate the valve mechanism as described above to admit air into the variable pressure chamber 24. Thus both pistons 22 and 23 will be operated to apply the brakes solely by the power of the booster motor. No pressure, of course, will be built up in the primary chamber 34 of the booster mechanism under such conditions, but the system will operate to provide reasonably rapid deceleration for an emergency stop.

From the foregoing, it will be apparent that the present construction provides distinct advantages over prior constructions of the type referred to. Throughout most of the operation of the brake mechanism there will be direct hydraulic reactions transmited to the operator's foot, such reactions increasing substantially in direct proportion to hydraulic pressures in the chamber 14. All of the parts of the control mechanism are coaxial and are directly associated with the manually operable master cylinder, thus providing for accuracy in operation and simplicity in installation.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A hydraulic booster system comprising a hydraulic chamber, a fluid displacing plunger movable thereinto, a fluid pressure motor having a pressure responsive unit connected to said plunger, a pedal operable master cylinder, a pressure responsive member having an end exposed to pressure in said master cylinder to be displaced axially in one direction thereby, a valve mechanism having connection with sources of relatively high and low pressures and with said motor and arranged to be engaged by said pressure responsive member to be moved thereby to operate said motor, a reaction chamber connected to said hydraulic chamber, said pressure responsive member having a reaction surface exposed to pressure in said reaction chamber to oppose valve operating movement of said pressure responsive member, a pressure counterbalancing device having an end substantially equal in area to said reaction surface exposed to pressure in said reaction chmaber, said device being movable in said direction by pressures in said reaction chamber, means connected between said device and said pressure responsive member for transmitting forces in said direction to said pressure responsive member thereby counterbalancing reaction forces acting against said reaction surface, and means arranged adjacent said pressure counterbalancing device to limit movement thereof when pressures in said reaction chamber increase to a predetermined point whereby further increases in pressure in said reaction chamber act fully against said reaction surface.

2. A system according to claim 1 wherein said means connected between said device and said pressure responsive member comprises a spring.

3. A system according to claim 1 wherein said pressure responsive member is in the form of a plunger having a reduced end in said reaction chamber, said pressure counterbalancing device comprising a sleeve slidably surrounding said reduced end of said pressure responsive member.

4. A system according to claim 1 wherein said pressure responsive member is in the form of a plunger having a reduced end in said reaction chamber, said pressure counterbalancing device comprising a sleeve slidably surrounding said reduced end of said pressure responsive member, said means for limiting movement of said pressure counterbalancing device comprising a ring engaging the end of such device opposite the first-named end thereof, and a stop member arranged in the path of travel of said ring.

5. A system according to claim 1 wherein said pressure responsive member is in the form of a plunger having reduced end in said reaction chamber, said pressure counterbalancing device comprising a sleeve slidably surrounding said reduced end of said pressure responsive member, said means for limiting movement of said pressure counterbalancing device comprising a ring engaging the end of such device opposite the first-named end thereof, and a stop member arranged in the path of travel of said ring, said means connected between said device and said pressure responsive member comprising a spring arranged between said ring and said pressure responsive member.

6. A hydraulic booster system comprising a hydraulic chamber, a first fluid displacing plunger movable thereinto, a fluid pressure motor having a pressure responsive unit connected to said plunger, a master cylinder, a pedal operable plunger movable into one end of said master cylinder to generate pressure therein, bearing means arranged in the other end of said master cylinder, a pressure responsive plunger slidable in said bearing means and having one end exposed directly to said master cylinder to be axially displaced in one direction by pressure therein, a valve mechanism having connection with sources of relatively high and low pressures and with said motor and arranged to be engaged by the other end of said pressure responsive member to be moved thereby to operate said motor, means forming with said bearing means a reaction chamber communicating with said hydraulic chamber, said pressure responsive member having a reaction shoulder in said reaction chamber facing away from said master cylinder to be subject to pressure in said reaction chamber to oppose movement of said pressure responsive member in said direction, a pressure counterbalancing device having an end substantially equal in area to said shoulder exposed to pressure in said reaction chamber to be moved by such pressure in said direction, means connected between said device and said pressure responsive member for transmitting forces in said direction to said pressure responsive member to counterbalance reaction forces acting against said shoulder, and means engageable with said pressure counterbalancing device to limit movement thereof in said direction when pressures in said reaction chamber increase to a predetermined point whereby further increases in pressure in said reaction chamber act fully against said shoulder.

7. A system according to claim 6 having a cylinder divided by said first plunger to form said hydraulic chamber and a primary chamber, said primary chamber communicating with said master cylinder.

8. A system according to claim 6 wherein said valve mechanism comprises a valve element arranged coaxial with and engageable by the other end of said pressure responsive member.

9. A system according to claim 6 wherein said means connected between said device and said pressure responsive member comprises a spring cage connected to the other end of said pressure responsive member, and a compression spring arranged between said cage and said pressure counterbalancing device.

10. A system according to claim 6 provided with a ring engaging the other end of said pressure counterbalancing device, said means connected between said device and said pressure responsive member comprising a spring cage connected to the other end of said pressure responsive member, and a spring arranged between said cage and said ring, said means to limit movement of said pressure counterbalancing device comprising a stop member arranged in the path of travel of said ring.

11. A system according to claim 6 wherein the first-named end of said pressure responsive member is provided with an axial extension projecting toward said pedal operable plunger to be engaged thereby to operate said valve mechanism upon a failure of pressure in said master cylinder.

No references cited.